(12) United States Patent
Lee et al.

(10) Patent No.: US 7,091,992 B2
(45) Date of Patent: Aug. 15, 2006

(54) THREE-DIMENSIONAL IMAGE DISPLAY

(75) Inventors: Byoungho Lee, Seoul (KR);
Jae-Hyeung Park, Seoul (KR);
Sung-Yong Jung, Seoul (KR);
Sung-Wook Min, Seoul (KR)

(73) Assignee: Byoungho Lee, Seoul (KR)

( * ) Notice: Subject to any disclaimer, the term of this patent is extended or adjusted under 35 U.S.C. 154(b) by 278 days.

(21) Appl. No.: 10/230,861

(22) Filed: Aug. 28, 2002

(65) Prior Publication Data

US 2003/0052876 A1    Mar. 20, 2003

(30) Foreign Application Priority Data

Aug. 30, 2001    (KR) ................ 2001-52835

(51) Int. Cl.
*G02B 27/22*    (2006.01)
*G02B 27/10*    (2006.01)
*H04N 13/00*    (2006.01)
*H04N 15/00*    (2006.01)
*G09G 3/00*    (2006.01)
*G09G 5/00*    (2006.01)

(52) U.S. Cl. ................ 345/629; 345/32; 348/42; 348/51; 359/462; 359/618

(58) Field of Classification Search ............ 345/32, 345/629; 348/42, 51; 359/462, 618
See application file for complete search history.

(56) References Cited

U.S. PATENT DOCUMENTS 6,061,489 A *  5/2000  Ezra et al. ................ 385/115

2002/0030887 A1 *  3/2002  Hamagishi et al. ........ 359/463

FOREIGN PATENT DOCUMENTS

| JP | 05-191838 | 7/1993 |
|---|---|---|
| JP | 09-304850 | 11/1997 |
| JP | 10-206795 | 8/1998 |
| JP | 2001-188199 | 6/2001 |

OTHER PUBLICATIONS

"3-D Computer Graphics Based on Integral Photography", Naemura, Yoshida, and Harashima, Feb. 12, 2001, Optics Express, vol. 8, No. 2, pp. 255-262.*

* cited by examiner

*Primary Examiner*—Ulka Chauhan
*Assistant Examiner*—Eric Woods
(74) *Attorney, Agent, or Firm*—Alston & Bird LLP (57) ABSTRACT

The present invention provides a three-dimensional display system by using Integral Photography (TIP) technology. The present invention comprises an elemental lens switch located between a lens array and an image display for selectively opening and closing each elemental lens; an image processor for generating elemental images and synchronizing them with control signals of the elemental lens switch; an image display for displaying the elemental images; and a lens array comprising elemental lenses, for forming the three-dimensional image by refracting and integrating the elemental images displayed on the display. Hence, it is possible to display three-dimensional images with a wider viewing angle than that of the conventional IP method, because each elemental lens is synchronized with the corresponding elemental image and is switched properly.

6 Claims, 6 Drawing Sheets

Real IP                Virtual IP

THREE-DIMENSIONAL IMAGE DISPLAY

BACKGROUND OF THE INVENTION (a) Field of the Invention

The present invention relates generally to a three-dimensional image display system and method thereof. More particularly, the present invention relates to a three-dimensional image display system and method based on integral photography (IP).

(b) Description of the Related Art

Among the technologies that display three-dimensional images, IP (Integral Photography), which uses a lens array, was first proposed by Lippmann in 1908. However, IP did not attract much attention at that time due to limitations of image capturing and displaying devices. But it has recently begun to be studied extensively with the development of high resolution image capturing and displaying devices.

Figure 1A:
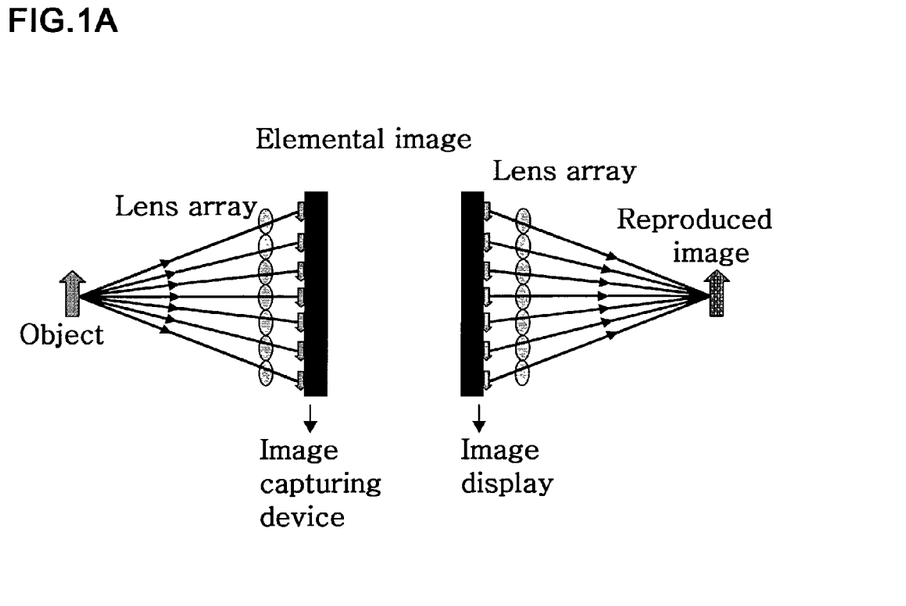
FIG. 1(a) shows the basic principle of conventional integral photography (IP)

FIG. 1(a) shows the basic principles of conventional IP.

As shown in FIG. 1(a), the system for realizing IP comprises two functional parts: a pickup and a display. The pickup comprises a lens array which forms elemental images of three-dimensional objects, and a capturing device which captures the elemental images formed by the lens array. The display comprises a displaying device which displays the elemental images that are taken by the capturing device, and a lens array which reproduces the elemental images into three-dimensional images. Each lens array comprises a plurality of elemental lenses.

In the pickup, many perspectives of the three-dimensional object observed from various directions, which are referred to as elemental images, are formed by the elemental lenses that constitute the lens array. These elemental images are captured and stored by the image capturing device. In the display, the reverse process of the pickup is performed. That is, the elemental images that were stored by the image capturing device are displayed by the image displaying device. These elemental images are integrated through the lens array to form three-dimensional images (also referred to as integrated images) with each perspective at the original positions.

CGIP (Computer-Generated Integral Photography), which produces elemental images by computer graphics, has been proposed to overcome a pseudoscopic phenomenon of the integrated images and to simplify the system structure.

Figure 1B:
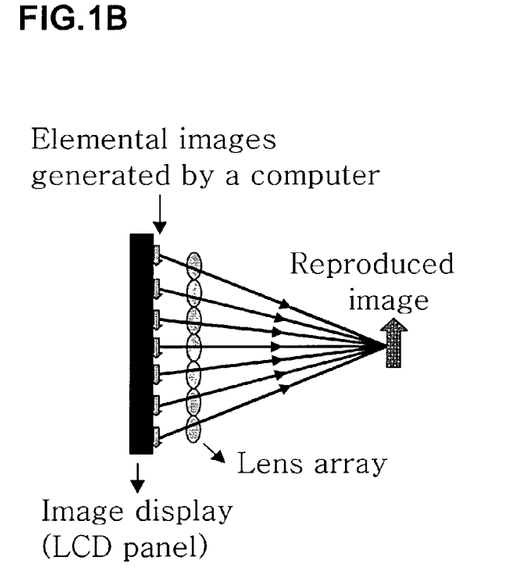
FIG. 1(b) shows the basic principle of Computer-Generated Integral Photography (CGIP)

FIG. 1(b) shows the configuration of the CGIP system. As shown in FIG. 1(b), the elemental images of the three-dimensional object are generated by computer graphics and then transmitted to the displaying device (LCD panel) to reproduce the three-dimensional image by the lens array. The position where the three-dimensional image (integrated image) is formed varies with the distance between the lens array and the display panel. The above-noted relation is described by the subsequent equation.

$$1/d + 1/g = 1/f \quad \text{[EQUATION 1]}$$

(where d is the distance between the integrated image and the lens array, g is the distance between the lens array and the LCD panel, and f is the focal length of the each elemental lens which comprises the lens array.)

Namely, when the distance between the lens array and the LCD panel is longer than the focal length of the elemental lens, the position of the image has a positive value, representing that the integrated image is formed in front of the lens array as a real image (a real IP). In another case, when the distance between the lens array and the LCD panel is shorter than the focal length of the elemental lens, the position of the image has a negative value, representing that the integrated image is formed behind the lens array as a virtual image (a virtual IP).

Figure 2:
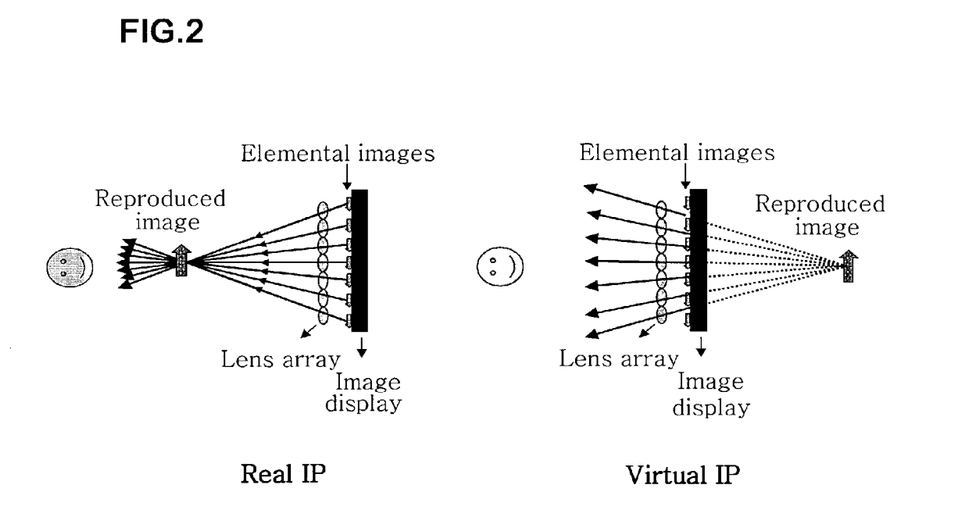
FIG. 2 shows the concepts of real IP and virtual IP.

FIG. 2 shows the difference between real IP and virtual IP. In virtual IP, since the position of the integrated image is further from the observer compared to the real IP case, the observer may advantageously see the three-dimensional image at a nearer position from the lens array and the LCD panel than the real IP. As shown in FIG. 2, an implementation of the virtual IP is similar to that of the real IP except that the elemental images of the virtual IP are erect images while those of the real IP are reverse images.

One of the problems of the IP system is a limitation of the viewing angle. In the IP system, an elemental image which exceeds the region of the corresponding elemental lens is removed from the displaying device to prevent the image overlapping phenomenon in which repeated integrated images in addition to the original integrated image are observed simultaneously. This process essentially limits the viewing angle of the IP system. Accordingly, the viewing angle thus limited is expressed in EQUATION 2.

$$\theta = 2\arctan\left(\frac{\psi}{2g}\right) \quad \text{[EQUATION 2]}$$

(where θ is the viewing angle of the system, Ψ is the pitch of the elemental lens, and g is the distance between the lens array and the displaying device.)

As expressed in EQUATION 2, since the viewing angle is proportional to the pitch of the elemental lens and inversely proportional to the distance between the lens array and the displaying device, it is required to either narrow the distance between the lens array and the displaying device or widen the pitch of the elemental lens, so as to widen the viewing angle. However, the distance between the lens array and the displaying device may not be arbitrarily reduced by more than a predetermined value, because the resolution of the integrated image degrades as the distance between the lens array and the displaying device decreases. In addition, widening of the pitch of the elemental lens to a great extent problematically causes the available depth of the integrated image to be decreased.

It is preferably required for a group of people to be able to view the reproduced three-dimensional images with a wide viewing angle, but the above-described limited viewing angle of the IP system fails to reach the desired realization of wide views, and this has been indicted as a weak point.

SUMMARY OF THE INVENTION

The objective of the present invention is to provide a three-dimensional display system with a wide viewing angle by switching on/off elemental lenses using an elemental lens switch and displaying elemental images in synchronization with the lens switch.

To fulfill this objective, the present invention provides an elemental lens switch between a lens array and a display, and changes the elemental images displayed on the display in synchronization with the elemental lens switch.

More particularly, a three-dimensional image display system according to a preferred embodiment of the present invention comprises: an image processor for generating elemental images for reproducing three-dimensional images; a display for displaying the elemental images; a lens array including a plurality of elemental lenses; and a lens switch for individually opening and shutting the elemental lenses.

The elemental lens switch opens and shuts each elemental lens independently by optical, mechanical, or electrical methods. It is desirable for the elemental lens switch to open and shut the elemental lenses in synchronization with the elemental images generated by the image processor.

BRIEF DESCRIPTION OF THE DRAWINGS

The above objects and advantages of the present invention will become more apparent by describing in detail preferred embodiments thereof with reference to the attached drawings, in which.

DETAILED DESCRIPTION OF THE PREFERRED EMBODIMENTS

The features and advantages of the present invention will become more apparent from the detailed description of preferred embodiments with reference to the accompanying drawings, wherein like reference numerals are used for description of like or equivalent parts or portions for simplicity of illustration and explanation.

Figure 3:
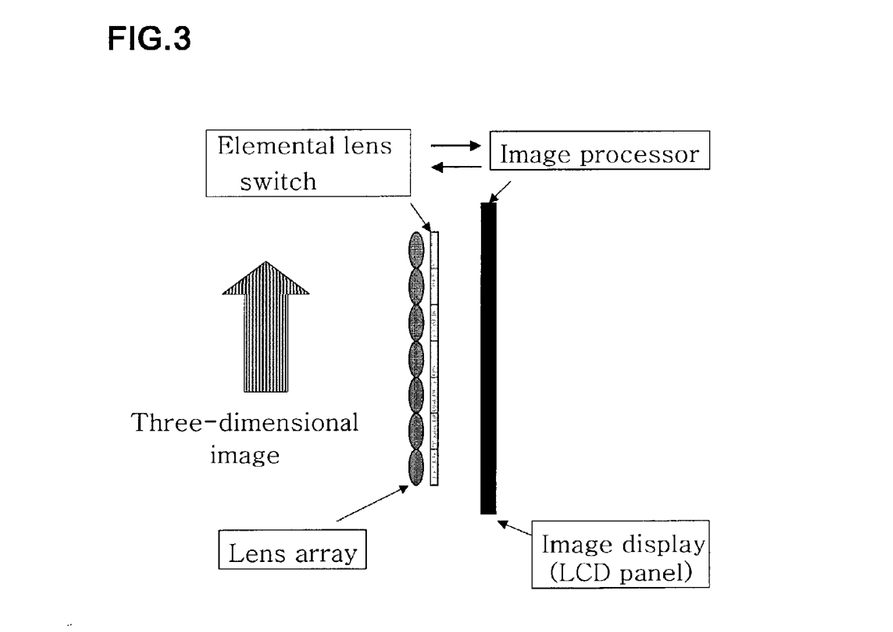
FIG. 3 shows a block diagram of a three-dimensional display system according to a first preferred embodiment of the present invention.

FIG. 3. shows a block diagram of the three-dimensional display system according to a preferred embodiment of the present invention.

The three-dimensional display system according to the present invention comprises a display, an image processor, a lens array, and an elemental lens switch.

The display receives image signals from the image processor, and displays the same. Existing displays such as liquid-crystal displays (LCDs) or flat cathode ray tubes (CRTs) may be used for the display. In the present embodiment, an LCD is adopted as an example of the display.

To display three-dimensional images, the image processor generates image signals and transmits them to the display to be displayed thereon. When the three dimensional images to be displayed are real images, the image processor generates the elemental images by the method based on real IP, and when they are virtual images, the image processor generates them by the method based on virtual IP. However, there is a difference in generating the elemental images between the conventional image processing method and the method used in the present invention.

Figure 4:
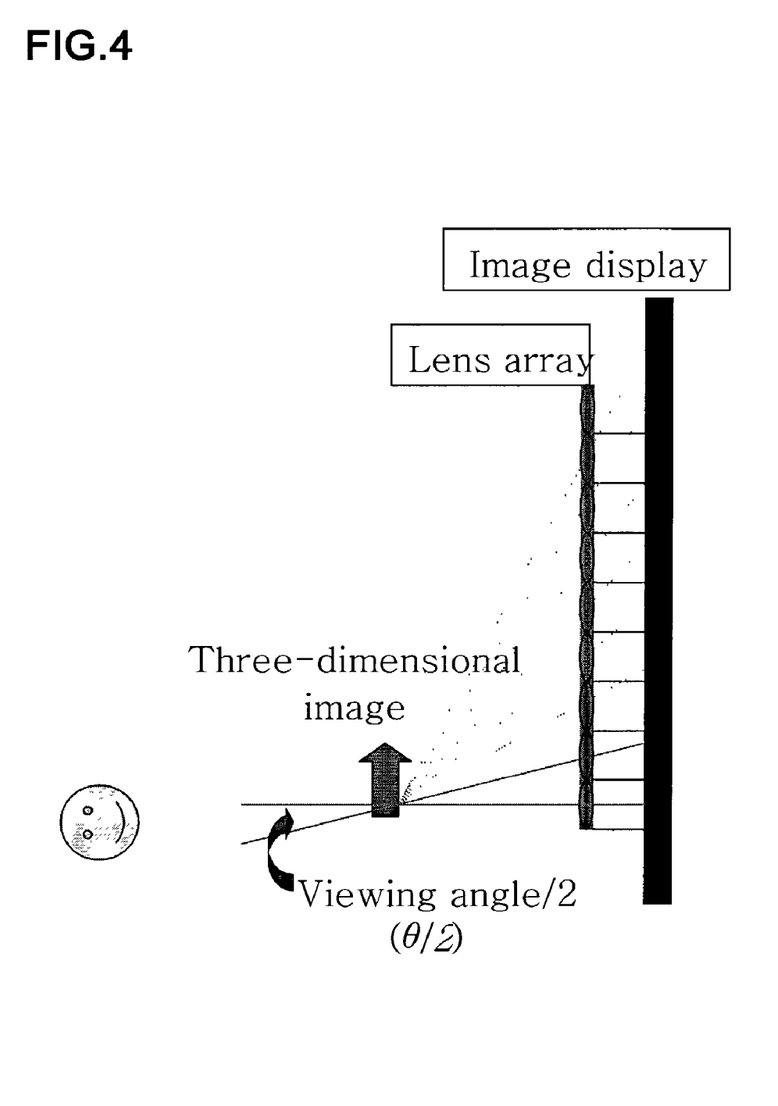
FIG. 4 shows the removed part of the elemental image during the elemental image generation process according to conventional IP.

In the conventional image processing method, the elemental images which exceed the region of corresponding elemental lenses are removed to prevent the image overlapping phenomenon in which the reproduced three-dimensional images are repeated and displayed simultaneously, as shown by the dotted lines in FIG. 4. However, the image processor according to the embodiment of the present invention does not remove the exceeded portions of the elemental images, but displays them on the display in the above-noted case. More detailed descriptions of this method will be subsequently provided.

In the conventional method, the elemental images for real IP and virtual IP are generated as follows.

Let the three-dimensional position of a point P which composes the displayed three-dimensional image be (x, y, z) in Cartesian coordinates, where z is the distance between the lens array and the point P. And assume that the coordinate of the center of the elemental lens which is located at the i-th coordinate from the left-most coordinate and at the j-th coordinate from the top-most coordinate in the lens array is (lens_x[i][j], lens_y[i][j]). Finally, let the size of the elemental lens in the x-axis direction be L_x, the size in the y-axis direction be L_y, and the focal length of the elemental lenses be f.

In this instance, the elemental image corresponding to the elemental lens that is located at the i-th coordinate from the left and the j-th coordinate from the top from among the elemental lenses of the virtual object point P, denoted as the point E_ij, has the coordinates determined by the following equations.

In the case of real IP:

$$\text{Elemental\_image\_}x[i][j]=\text{lens\_}x[i][j]+(f/z)*(\text{lens\_}x[i][j]-x) \quad \text{[EQUATION 3]}$$

$$\text{Elemental\_image\_}y[i][j]=\text{lens\_}y[i][j]+(f/z)*(\text{lens\_}y[i][j]-x) \quad \text{[EQUATION 4]}$$

In the case of virtual IP:

$$\text{Elemental\_image\_}x[i][j]=\text{lens\_}x[i][j]-(f/z)*(\text{lens\_}x[i][j]-x) \quad \text{[EQUATION 5]}$$

$$\text{Elemental\_image\_}y[i][j]=\text{lens\_}y[i][j]-(f/z)*(\text{lens\_}y[i][j]-y) \quad \text{[EQUATION 6]}$$

According to the conventional elemental image generating method, however, the point E_ij calculated by EQUATION 3 and EQUATION 4, or EQUATION 5 and EQUATION 6, is not always the elemental image corresponding to the elemental lens located at the i-th coordinate from the left and the j-th coordinate from the top in the lens array, but the point E_ij becomes the desired elemental image when it satisfies the subsequent two conditions:

$$-Lx/2 < \text{Elemental\_image\_}x[i][j]-\text{lens\_}x[i][j] < Lx/2; \text{ and} \quad \text{(CONDITION 1)}$$

$$-Ly/2 < \text{Elemental\_image\_}y[i][j]-\text{lens\_}y[i][j] < Ly/2 \quad \text{(CONDITION 2)}$$

If all values of E_ij which satisfy the conditions from EQUATION 3 and 4 or 5 and 6 are chosen to be the elemental images regardless of the CONDITION 1 and 2, a plurality of reproduced three-dimensional images is concurrently viewed, thereby resulting in the degradation of the quality of the reproduced three-dimensional images. Therefore only the values of E_ij which satisfy conditions from not only EQUATION 3 and EQUATION 4 or EQUATION 5 and EQUATION 6, but also from CONDITION 1 and CONDITION 2 are chosen to be the elemental image to prevent the degradation. As a tradeoff, however, the viewing angle of the three-dimensional image is limited by the restriction of CONDITIONs 1 and 2. In the present invention, since the elemental lens switch is used to prevent the problem of repetition of the reproduced three-dimensional image, all values of the point E_ij or the points E_ij that satisfy predetermined conditions alleviated than CONDITIONs 1 and 2 are set as the elemental images with no relation to satisfaction states of CONDITIONs 1 and 2 from among the points E_ij calculated according to EQUATIONs 3 and 4 or EQUATIONs 5 and 6, thereby widening the viewing angle of the reproduced three-dimensional image.

All the elemental images are not concurrently displayed on the display, but those corresponding to each elemental lens are sequentially displayed, synchronized with the elemental lens switch, and hence the viewing angle is widened while the image overlapping phenomenon is prevented.

In the present invention, there may be various modifications in the methods for sequentially displaying the elemental images on the display and applying the elemental lens switch. One example of these methods is described hereinafter as a preferred embodiment of the present invention.

Figure 5:
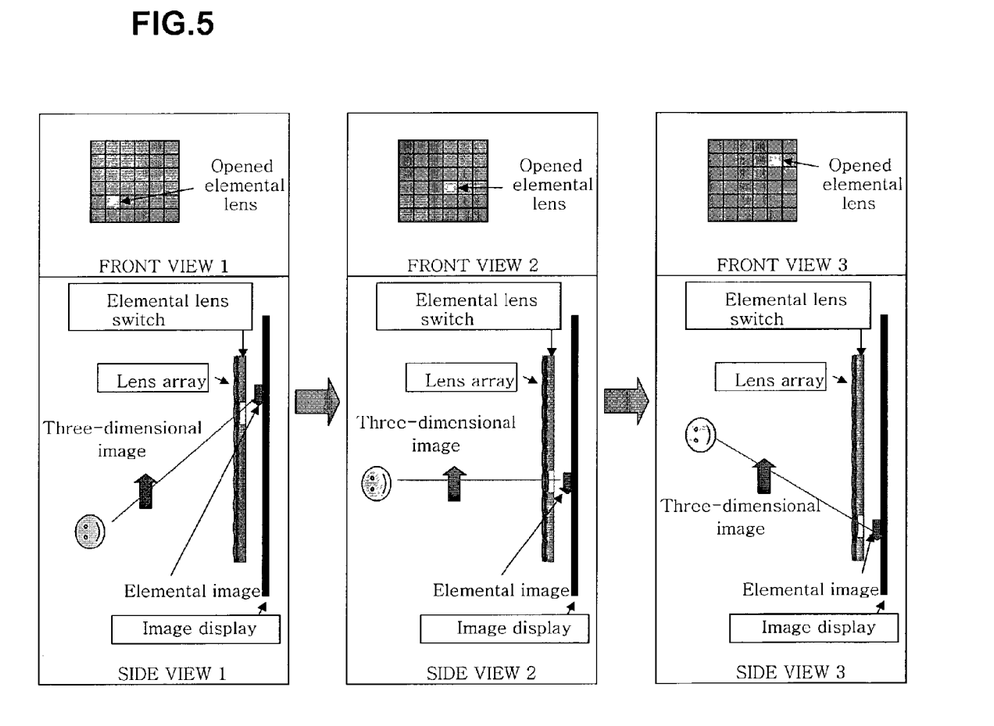
FIG. 5 shows a block diagram which describes an operational principle of the three-dimensional display system according to a first preferred embodiment of the present invention.

FIG. 5 shows the concept of the method. Only the elemental image that is assigned to one of the elemental lenses is displayed on the display, and only the assigned elemental lens is opened while the others are closed by the elemental lens switch. Next, one currently opened elemental lens is closed and another elemental lens is opened, and corresponding elemental image which is assigned to the newly opened elemental lens is displayed on the display. This process is repeated rapidly for all the elemental lenses in one operation period. As a result, the observer feels as if all the elemental lenses are opened simultaneously due to the afterimage effect, and they may see complete three-dimensional images. In this instance, the elemental images generated by the image processor are formed by setting all the points E_ij as the elemental images that satisfy EQUATIONs 3 and 4 or EQUATIONs 5 and 6, without relation to CONDITIONs 1 and CONDITION 2. Therefore, the viewing angle of the reproduced three-dimensional image is increased both in the vertical and horizontal directions. The increased viewing angle is described in the following equations:

$$\theta_x = 2\arctan\left(\frac{D_x}{2l}\right)$$ [EQUATION 7]

$$\theta_y = 2\arctan\left(\frac{D_y}{2l}\right)$$ [EQUATION 8]

where $\theta x$ and $\theta y$ are the horizontal viewing angle and the vertical viewing angle respectively, Dx and Dy are the lengths of the display in the horizontal and vertical directions, and l is the distance between the lens array and the reproduced three-dimensional image.

The lens array integrates the elemental images displayed on the display to form three-dimensional images.

The elemental lens switch, located between the lens array and the display, selectively blocks the light emitting from the display to predetermined elemental lenses according to a control signal from the image processor. Specifically, devices like an LCD shutter, a spatial light modulator (SLM), and a mechanical shutter may be used for the elemental lens switch.

Next, a second preferred embodiment of the present invention is described. In the second preferred embodiment of the present invention, the basic principle is similar to that of the first preferred embodiment, but the method for sequentially displaying the elemental images on the display and applying the elemental lens switch is slightly different from that of the first preferred embodiment.

Figure 6:
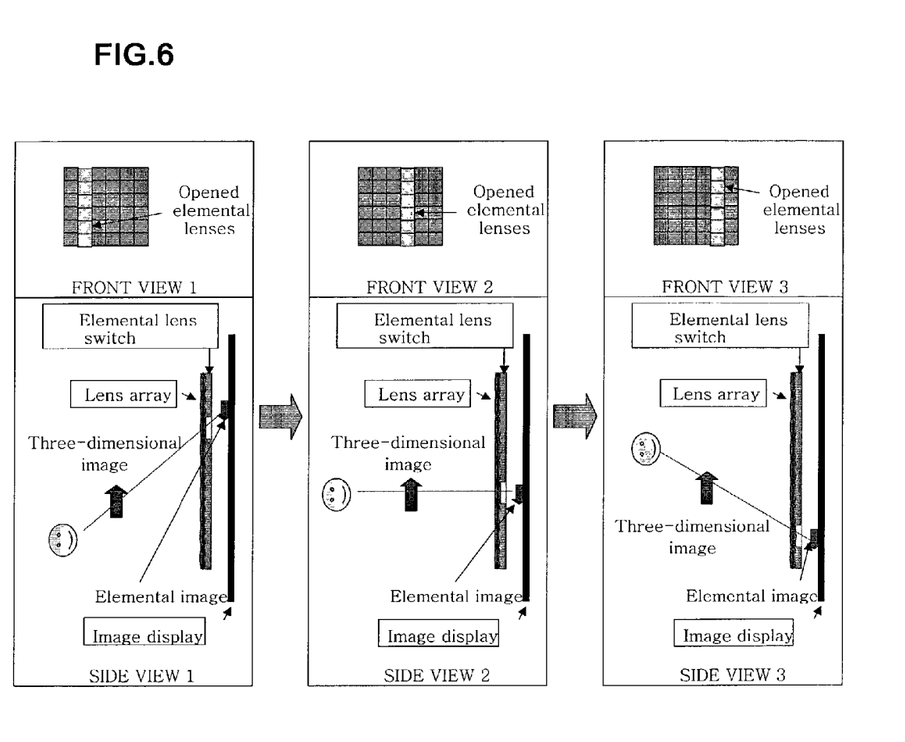
FIG. 6 shows a block diagram which describes an operational principle of a three-dimensional display system according to a second preferred embodiment of the present invention.

FIG. 6 shows the concept of the lens switching method according to the second preferred embodiment of the present invention. One column of the elemental lenses is opened while the others are closed by the elemental lens switch, and the elemental images corresponding to the opened column of the elemental lenses are displayed on the display. Next, the currently opened column of the elemental lenses is closed, another column of the elemental lenses is opened, and the elemental images corresponding to the newly opened column of the elemental lenses are displayed on the display. This process is quickly repeated for all the elemental lenses in one operation period. In this instance, the elemental images displayed on the display satisfy CONDITION 2 without relation to satisfaction states of CONDITION 1 from among the points E_ij calculated according to EQUATIONs 3 and 4 or EQUATIONs 5 and 6 in the like manner of the elemental image producing method described in the first preferred embodiment of the present invention. Hence, according to this method, the viewing angle of the reproduced three-dimensional image is increased in the horizontal direction, but the viewing angle in the vertical direction is the same as that of the conventional IP method. EQUATION 7 expresses the viewing angle in the horizontal direction.

In this case, the operation period on the elemental lens switch process according to the second embodiment is shorter than that of the first preferred embodiment because the elemental lenses are switched in a column unit in the second embodiment while each elemental lens is switched in the first preferred embodiment. Therefore, the speed of switching the lenses may be slower in comparison with the case of the first preferred embodiment. However, since only the points of E_ij that satisfy CONDITION 2 from among the points calculated by EQUATIONs 3 and 4 or EQUATIONs 5 and 6 are chosen to be the elemental images, owing to this limitation of CONDITION 2, the viewing angle in the vertical direction is not widened.

Next, as to the third preferred embodiment of the present invention, the basic principle of the third preferred embodiment is similar to that of the second preferred embodiment except that the elemental lens switching operation is performed on a row of the elemental lenses instead of a column of the elemental lenses as in the second preferred embodiment.

In this instance, E_ij, the elemental images generated by the image processor, are those that satisfy CONDITION 1 from among the points E_ij calculated according to EQUATIONs 3 and 4 or EQUATIONs 5 and 6, thereby widening the viewing angle of the reproduced three-dimensional images in the vertical direction. Here, the increased viewing angle in the vertical direction is described in EQUATION 8.

Figure 7:
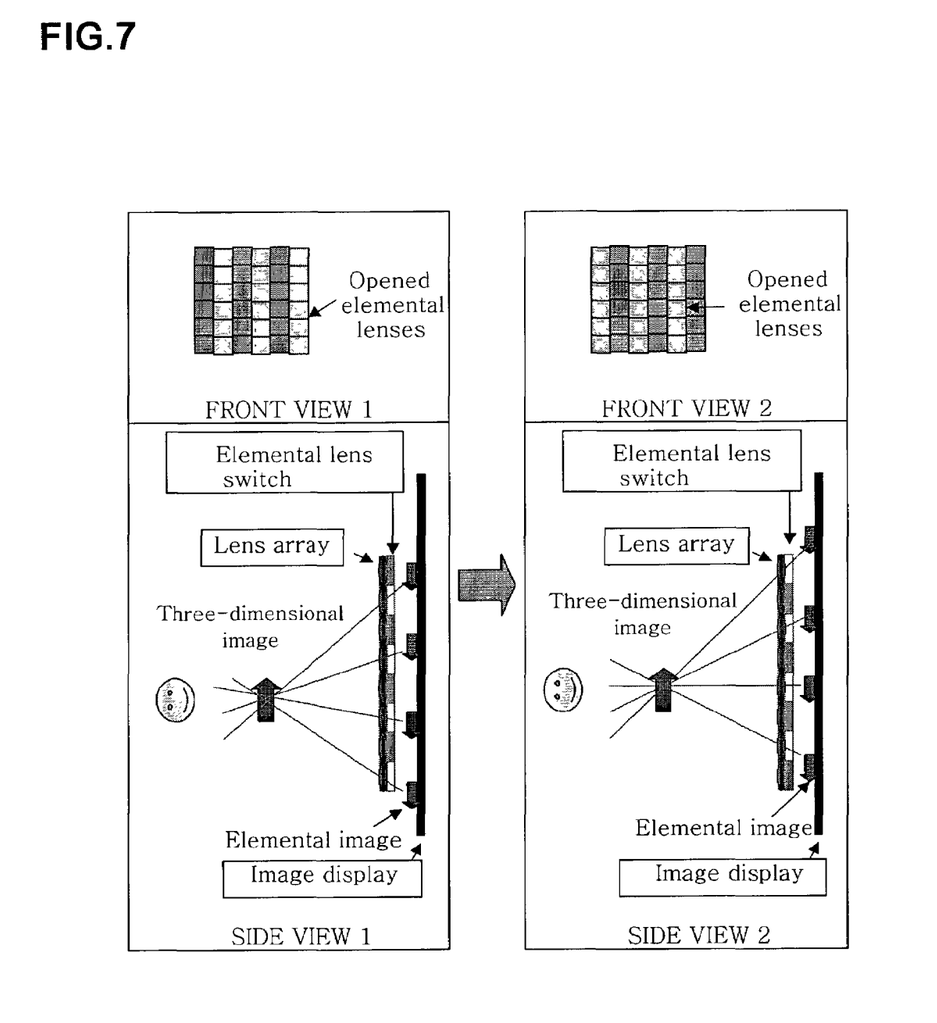
FIG. 7 shows a block diagram which describes an operational principle of a three-dimensional display system according to a fourth preferred embodiment of the present invention.

Next, in the fourth preferred embodiment of the present invention, the basic operational principle is similar to those of the first and second preferred embodiments, but there exists a difference in sequentially displaying the elemental images on the display and switching the elemental lenses. FIG. 7 shows the concept of this method. The elemental lenses which lie in every other column or every other row are opened and the others are closed. At the same time, the elemental images for the opened elemental lenses are displayed on the display. Then, the opened elemental lenses are closed and the remaining elemental lenses that were closed at the first stage are opened. Simultaneously, the elemental images for the newly opened elemental lenses are displayed on the display. These two stages constitute one operation period and are repeated rapidly. In this instance, when the elemental lens-switching operation unit switches every other column of the elemental lenses, the elemental images generated by the image processor are those that satisfy the previous CONDITION 2 and a subsequent CONDITION 3 from among the points E_ij calculated according to the EQUATIONs 3 and 4 or EQUATIONs 5 and 6. Similarly, when the elemental lens-switching operation unit switches every other row of the elemental lenses, the elemental images are those that satisfy the previous CONDITION 1 and the subsequent CONDITION 4.

$$-Lx < Elemental\_image\_x[i][j] - lens\_x[i][j] < Lx \quad (CONDITION\ 3)$$

$$-Ly < Elemental\_image\_y[i][j] - lens\_y[i][j] < Ly \quad (CONDITION\ 4)$$

It is easily found that the CONDITION 3 and CONDITION 4 are alleviated than the CONDITION 1 and CONDITION 2. Therefore, more elemental images may be displayed on the display without image overlap, and consequently the viewing angle is increased.

In comparison with the preferred embodiments 1, 2, and 3, the required speed of the elemental lens switch for the afterimage effect may be slower because the period of elemental lens switching operation is shorter than any of the cases described above. As a tradeoff, however, the viewing angle is smaller than that of the preferred embodiments 1, 2, and 3.

While the present invention has been particularly shown and described with reference to specific preferred embodiments, it should be understood by those skilled in the art that various changes in form and detail may be made therein without departing from the spirit and scope of the present invention as defined by the appended claims.

As described above, the preferred embodiments of the present invention provide an IP system with a viewing angle which is wider than that of the conventional IP system, because the elemental images include portions that are not displayed on the display in the conventional IP, and they are displayed according to opened corresponding elemental lenses in synchronization with the lens switch which opens and closes the elemental lenses selectively.

What is claimed is:

1. A three-dimensional display system comprising:
   an image processor for generating elemental images;
   an image display for displaying the elemental images generated by the image processor;
   a lens array, including at least one or more elemental lenses, for forming a three-dimensional image by refracting and integrating the elemental images displayed on the image display; and
   an elemental lens switch, located between the lens array and the image display, selectively opening and closing each elemental lens responsive to a control signal from the image processor,
   wherein the image processor generates an elemental image (Elemental_image_x[i][j], Elemental_image y[i][j]) of the object point P of the three-dimensional image, according to one of the subsequent equation sets, where P has a position of a coordinate (x, y) and the distance from the lens array to the paint P is z:

first equation set:

$$Elemental\_image\_x[i][j]=lens\_x[i][j]+(f/z)*(lens\_x[i][j]-x);\ and$$

$$Elemental\_image\_y[i][j]=lens\_y[i][j]+(f/z)*(lens\_y[i][j]-y)$$

or
second equation set:

$$Elemental\_image\_x[i][j]=lens\_x[i][j]-(f/z)*(lens\_x[i][j]-x);\ and$$

$$Elemental\_image\_y[i][j]=lens\_y[i][j]-(f/z)*(lens\_y[i][j]-y)$$

(wherein (lens_x[i][j], lens_y[i][j]); the coordinate of the center of the elemental lens which is located at the i-th coordinate from the left and the j-th coordinate from the top in the lens array, and f: the focal length of to elemental lens), and wherein the image processor generates a point of coordinate (Elemental_image x[i][j], Elemental_image y[i][j]) calculated by the equation described above as the elemental image of the point P, when the point (Elemental_image_x[i][j], Elemental_image y[i][j]) satisfies one of the following pairs of conditions:

$$-Lx < Elemental\_image\_x[i][j] - lens\_x[i][j] < Lx\ and$$

$$-Ly/2 < Elemental\_image\_y[i][j] - lens\_y[i][j] < Ly/2;$$

or $$-Lx/2 < Elemental\_image\_x[i][j] - lens\_x[i][j] < Lx/2\ and$$

$$-Ly < Elemental\_image\_y[i][j] - lens\_y[i][j] < Ly$$

(wherein Lx: the size of the elemental lens in the x-direction,
Ly: the size of the elemental lens in the y-direction).

2. The three-dimensional display system of claim 1, wherein the image display displays elemental images that correspond to predetermined elemental lenses, and the elemental lens switch opens the predetermined elemental lenses and closes the other elemental lenses.

3. The three-dimensional display system of claim 1, wherein the image processor generates a point of the coordinate (Elemental$_{13}$ image$_{13}$ x[i][j], Elemental$_{13}$ image$_{13}$ y[i][j]) as the elemental image of the point P, when the point satisfies one of the following conditions:

$$-Lx/2 < Elemental\_image_{13}\ x[i][j] - lens\_x[i][j] < Lx/2;$$
or
$$-Ly/2 < Elemental\_image_{13}\ y[i][j] - lens\_y[i][j] < Ly/2$$

(wherein Lx: the size of the elemental lens in the x-direction. Ly: the size of the elemental lens in the y-direction).

4. The three-dimensional display system of claim 1, wherein the image display sequentially displays the elemental images that correspond to each elemental lens, and the elemental lens switch sequentially opens the corresponding elemental lens in synchronization with the image display.

5. The three-dimensional display system of claim 3, wherein the image display sequentially displays the elemental images that correspond to the row or column of the elemental lenses, and the elemental lens switch sequentially opens the corresponding row or column of the elemental lenses in synchronization with the image display.

6. The three-dimensional display system of claim 1, wherein the image display alternately displays the elemental images that correspond to every other row or every other column of the elemental lenses, and the elemental lens switch alternately opens the corresponding every other row or every other column of the elemental lenses in synchronization with the image display.

* * * * *

UNITED STATES PATENT AND TRADEMARK OFFICE
CERTIFICATE OF CORRECTION

PATENT NO. : 7,091,992 B2  Page 1 of 1
APPLICATION NO. : 10/230861
DATED : August 15, 2006
INVENTOR(S) : Lee et al.

It is certified that error appears in the above-identified patent and that said Letters Patent is hereby corrected as shown below:

<u>Title page,</u>
Item (57), ABSTRACT,
Line 2, "(TIP)" should read --(IP)--.

<u>Column 7,</u>
Line 67, "paint" should read --point--.

Signed and Sealed this

Second Day of January, 2007

JON W. DUDAS
*Director of the United States Patent and Trademark Office*